Feb. 16, 1965 D. M. CRAWFORD 3,169,266
WINDOW WIPER MECHANISM
Filed Oct. 22, 1962
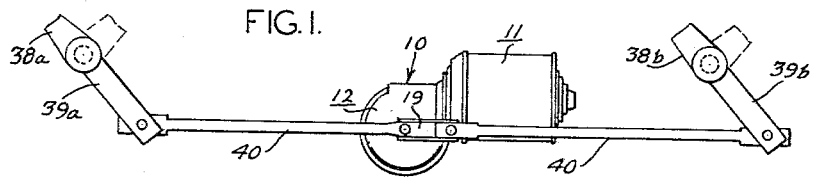
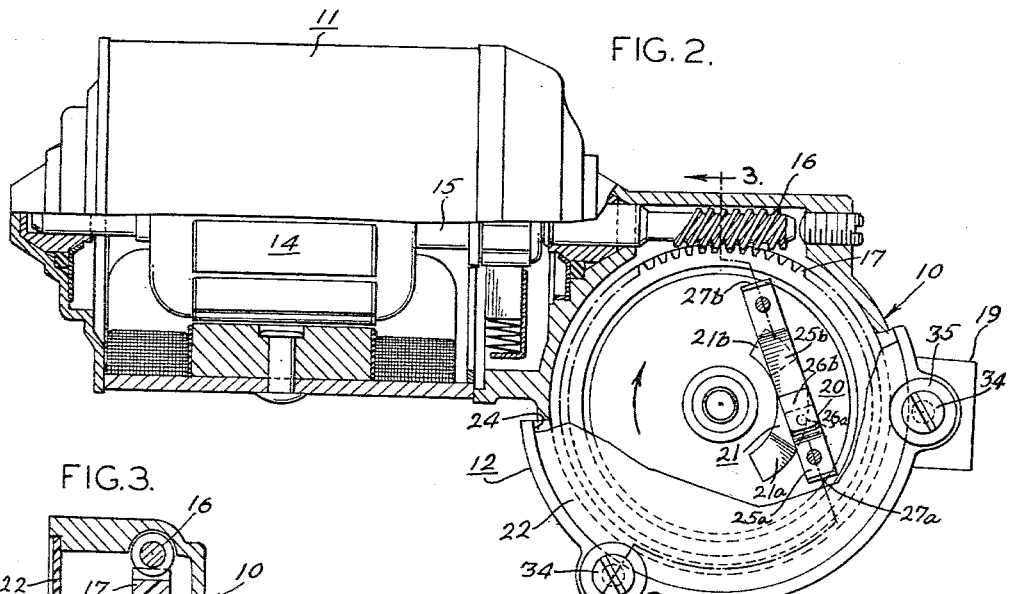
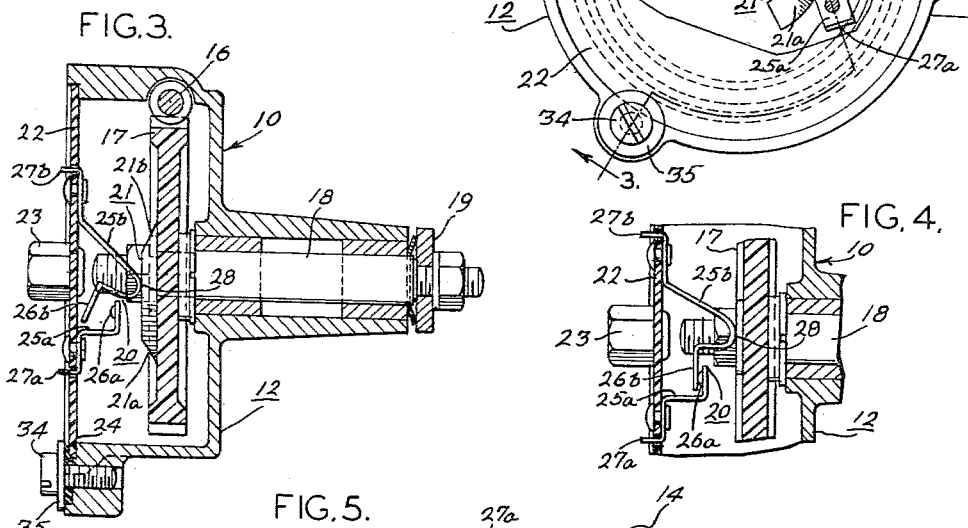
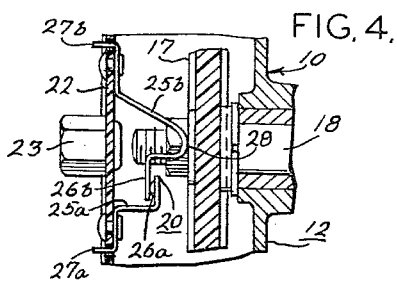
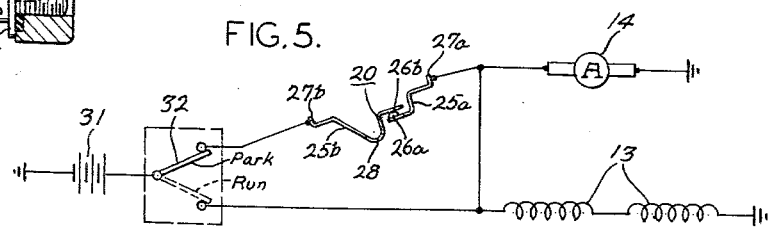
INVENTOR:
DAVID M. CRAWFORD
BY Howson & Howson
ATTYS.

3,169,266
WINDOW WIPER MECHANISM
David M. Crawford, Columbus, Miss., assignor to American Bosch Arma Corporation, Garden City, N.Y., a corporation of New York
Filed Oct. 22, 1962, Ser. No. 232,203
4 Claims. (Cl. 15—250.17)

This invention relates to a windshield wiper mechanism and more specifically to such a mechanism which is capable of parking or stopping at a pre-selected position. More specifically, the invention relates to a combination of the mechanism, the parking switch and the drive motor which permits the desired result.

In the prior art various mechanisms have been devised for driving windshield wipers and a number of these have been provided with so called "parking" features whereby windshield wipers may be stopped at a pre-selected position. Many of these mechanisms involved complex structures including many additional parts in order to obtain the parking feature. The present invention by contrast employs a highly simplified structure with a minimum number of additional parts and a minimum modification of other parts in order to achieve the desired effect. Moreover, the present invention permits a structure which is safe, effective and essentially free from any danger of malfunctioning. In preferred embodiments of the present invention, the selected parking position may be adjusted over wide ranges to essentially any position assumed by the windshield wiper. This adjustment is accomplished by a simple direct expedient which requires no fine calibration or adjustment.

For better understanding of the present invention, reference is made to the accompanying drawings in which:

FIG. 1 is a diagrammatic representation of the wiper mechanism in combination with one typical arrangement of windshield wiper linkage;

FIG. 2 is a view partially in section showing a windshield wiper mechanism in accordance with the present invention;

FIG. 3 is a sectional view taken along line 3—3 of FIG. 2;

FIG. 4 is a detailed view similar to a portion of FIG. 3, showing the other position of the parking switch contacts; and FIG. 5 is a schematic wiring diagram showing the circuitry employed with this wiper mechanism.

Referring to FIGS. 2–4, the mechanism is provided with a support frame generally designated 10 and consisting primarily of the casing for the drive motor, generally designated 11, and the wiper mechanism, generally designated 12.

In most applications the motor will be a direct current motor of shunt or compound wound type. A shunt wound motor is schematically represented in FIG. 5 wherein the field coils 13 are connected in parallel with windings on the armature 14. The preferred arrangement, as shown, has the armature and field coils connected together at one end and to ground at the other end. The armature drives its shaft 15 which carries a worm 16. The worm in turn drives a worm gear 17 on shaft 18 which provides drive output to the wiper linkage. The shaft is supported in suitable bearings within the housing frame generally designated 10. The shaft at its external end is preferably connected to a lever 19 by which, in turn, it is connected to the wiper actuating linkage system shown in FIG. 1 and described below.

The worm gear 17 itself may act as a rotatable member or may drive another rotatable member on shaft 18 which participates in the actuation of the parking switch 20. Preferably, the worm gear 17 serves as the rotatable member, and, in this event, the gear is preferably made of nylon or other insulating material. At a predetermined radius on one of its flat faces the rotatable member is provided with a cam member 21 preferably in the form of a raised shoulder positioned at a radius on the rotatable member to actuate the switch 20 and provided with sloping faces 21a and 21b at each end to provide an inclined plane for gradually actuating the switch 20. The cam is located at a predetermined radius, determined by the location of the switch 20 which it opposes. The switch for its part is located on a portion of the housing or frame 10 and preferably on a round insulator disk deck 22 which fits into an annular recess 24 on the housing and serves as a cover for the housing as well. This arrangement makes deck 22 rotatable relative to the rest of the housing about the same axis as the shaft 18 and it is provided with an actuator such as hexagonal stud 23 which may be used to relocate the deck 22 to the rest of the housing. The switch 20 is mounted on insulating deck 22 and preferably consists of two contact support members 25a and 25b supporting respectively the fixed contact 26a and movable contact 26b. Support 25a is therefore a relatively rigid member connected to the deck 22 in such a way as to provide an external terminal 27a for contact 26a outside of the housing. Contact support 25b by contrast is a flexible metal member of spring metal such as beryllium copper fixed to the deck 22 in such a way as to provide an external terminal 27b for movable contact 26b. The location of the switch on this deck is such that the shoulder 25b over the entire effective length of the cam. In the 21 will contact a portion of the spring support member 25b over the entire effective length of the cam. In the arrangements shown the cam drives the contact 26b through its support 25b away from fixed contact 26a. In this particular embodiment, the spring member 25b is provided with a cam follower bend 28 which cooperates with the cam member 21. By making deck 22 rotatable axially with the axis of the rotation of the rotatable member 17, the effective parking position of the wiper can be changed.

The action of the cam member on the switch 20 can be seen by comparison of FIGS. 3 and 4. As can be seen in the circuit diagrams of FIG. 5, the connection between the power supply 31 and the common motor connection between the armature and the coils, is alternatively made to include or exclude parking switch 20. This is accomplished by manual switch 32. To start the motor switch 32 is placed into the dashed line position marked "run." In this position, even though the parking switch is opened once each revolultion it will not interrupt the flow of current to the motor. However, when the switch 32 is placed back in its alternative solid line position, the motor will continue to run until it reaches the point at which the parking switch 20 is actuated by the cam 21. At this point the contacts 26a and 26b will open and the motor will stop since its energizing current will be interrupted.

From this description, it will be observed that the location of the switch 20 relative to the cam 21 determines when the motor will stop operating and in what position the windshield wiper will stop or "park." By rotating the deck 22, switch is rotated about the axis of rotation of the rotatable member 17 and thus maintains the same radius as the cam. A parking position selection feature is provided in this way permitting effectively universal adjustment of windshield wiper parking position. The parking position may be selected at any desired position of the windshield wiper merely by adjusting the rotational position of deck 22 through the hexagonal stud 23. The deck is held in place by means of the sidewalls of its supporting recess 24 and screws 34 in housing 10 and washers 35 which when tightened down against the deck clamp it in position against the bottom wall of recess.

It will be observed that it is advantageous to have the switch fixed to the frame and the cam actuator 21 rotatable because leads must be connected to the switch terminals 27a and 27b. Although conceivably an arrangement employing a movable switch might be used in some instance, use of an insulating deck for the switch support 22 and an insulating member, or at least an insulating cam 21, essentially eliminates any danger of short circuits occurring through the switch.

The window wiper mechanism illustrated may be connected to any conventional type of linkage system. For the purpose of illustration, FIG. 1 shows a linkage system connecting the mechanism to two windshield wipers 38a and 38b, the range of movement of which is represented by dashed lines. These wipers are supported respectively on arms 39a and 39b which are rotatably supported on the vehicle frame which the frame of the mechanism is also supported. A simple connecting linkage 40 converts the motion of the rotatable member 17 and its lever arm 19 to the oscillatory motion required to drive the windshield wipers in their arcs.

It will be observed that this windshield wiper mechanism provides a minimum of additional parts and a minimum of modification of parts otherwise required for a mechanical system and that the construction is altogether simple, easily assembled and capable of trouble free operation. Moreover, it will be seen that the parking position may be varied using preferred embodiments of the invention to any position within the wiper range of normal movement.

I claim:

1. A windshield wiper mechanism comprising a motor, a rotatable member coupled to said motor and driven thereby to supply driving motion to a connection for a conventional windshield wiper linkage, a frame supporting said motor and said rotatable member, a parking switch including a pair of contacts electrically connectable in the circuit of the motor and a movable support member for one of the switch contacts, a cam operator, the parking switch being mounted on a portion of the frame which is movable relative to the rest of the frame about the same axis of rotation as the rotatable member and the cam operator being mounted on the rotatable member, such that the relative rotatable motion between the parking switch and cam operator will cause the cam to move against the movable support to open the parking switch contacts, the cam being at a radius on the rotatable member selected to produce actuation of the parking switch over the length of the cam, means to fix the movable portion of the frame in selected positions, a manual switch and electrical connectors for directly connecting the motor to a source of power through the electrical connectors, with the length of the electrical connectors of the manual switch allowing remote location of the manual switch from the rest of the windshield wiper mechanism, the manual switch serving to provide the direct connection of the motor to the source of power and when the direct connection is open the motor is connected to the source of power through the parking switch alone, whereby the motor driving the mechanism will stop when the parking switch contacts are opened, the parking switch being actuated open by the cam operator once each revolution irrespective to the contact position of the manual switch, the movable portion of the frame providing adjustment of the wiper parking position.

2. The windshield wiper mechanism of claim 1 in which the coupling between the motor and the rotatable member consists of a worm on the motor shaft driving a worm gear and the rotatable member is a worm gear, with the rotatable member being an insulator and the cam operator being an integral part of the rotatable member adapted to actuate the movable support member supporting one of the contacts of the parking switch which is normally closed.

3. A windshield wiper mechanism comprising a motor, a rotatable member coupled to said motor and driven thereby to supply driving motion to a connection for a conventional windshield wiper linkage, a frame supporting said motor and said rotatable member, a parking switch including a pair of contacts electrically connectable in the circuit of the motor and a movable support member for one of the switch contacts, a cam operator, the parking switch being mounted on a portion of the frame which is movable relative to the rest of the frame and the cam operator being mounted on the rotatable member, such that the relative rotatable motion between the parking switch and cam operator will cause the cam to move against a spring contact support member supporting one of the parking switch contacts to open the parking switch contacts which are normally closed, a manual switch and electrical connectors for directly connecting the motor to a source of power through the electrical connectors, with the length of the electrical connectors of the manual switch allowing remote location of the manual switch from the rest of the windshield wiper mechanism, the manual switch serving to provide the direct connection of the motor to the source of power and when the direct connection is open the motor is connected to the source of power through the parking switch alone, whereby the motor driving the mechanism will stop when the parking switch contacts are opened, the parking switch being actuated open by the cam operator once each revolution irrespective of the contact position of the manual switch, the movable portion of the frame providing adjustment of the wiper parking position.

4. The windshield wiper mechanism of claim 3 in which the coupling between the motor and the rotatable member consists of a worm on the motor shaft driving a worm gear and the rotatable member is the worm gear.

References Cited in the file of this patent
UNITED STATES PATENTS

| 2,825,913 | Oishei | Mar. 11, 1958 |
| 3,059,264 | Ziegler | Oct. 23, 1962 |

FOREIGN PATENTS

| 210,317 | Australia | Sept. 19, 1957 |

UNITED STATES PATENT OFFICE
CERTIFICATE OF CORRECTION

Patent No. 3,169,266                            February 16, 1965

David M. Crawford

It is hereby certified that error appears in the above numbered patent requiring correction and that the said Letters Patent should read as corrected below.

Column 2, line 31, strike out "25b over the entire effective length of the cam. In the".

Signed and sealed this 6th day of July 1965.

(SEAL)
Attest:

ERNEST W. SWIDER                            EDWARD J. BRENNER
Attesting Officer                                Commissioner of Patents